Sept. 26, 1961 R. C. PALMER 3,002,102

LIGHT AMPLIFIER

Filed July 9, 1959

INVENTOR.
RICHARD C. PALMER
BY Darby & Darby
ATTORNEYS

United States Patent Office 3,002,102

Patented Sept. 26, 1961

3,002,102

LIGHT AMPLIFIER

Richard C. Palmer, Pompton Plains, N.J., assignor, by mesne assignments, to Fairchild Camera and Instrument Corporation, Syosset, N.Y., a corporation of Delaware Filed July 9, 1959, Ser. No. 826,065
10 Claims. (Cl. 250—213)

This invention relates to a light amplifier, and more particularly to a novel structure therefor.

Light amplifiers are devices wherein a small amount of radiation impinging upon a given area causes that area to glow brightly. A mosaic of such areas, or cells, is thus able to produce a bright display that corresponds in shape, size and brightness variations to the impinging radiation pattern. Thus, weak radiations such as light or invisible radiations like infra red or ultra violet, can produce a bright visible display.

One type of light amplifier comprises two basic elements. The first is a switching arrangement that permits the flow of electricity in the presence of radiation, but prevents the flow of current in the absence of radiation; the second element being an electroluminescent material that glows when electricity flows through it. The switching arrangement often uses a material known as a photoconductor, whose resistance decreases in the presence of impinging radiation. In most prior art switching arrangements, the "dark" resistance, i.e., resistance of the unirradiated photoconductor, has been too low to withstand the voltage necessary to produce the desired brightness when irradiation occurs.

Prior art light amplifiers were extremely difficult to manufacture, and therefore expensive. This condition existed because each cell had to be individually made, and the desired number of cells then precisely assembled.

It is therefore the principal object of my invention to provide an improved light amplifier.

It is another object of my invention to provide a light amplifier that may be easily made.

Figure 1:
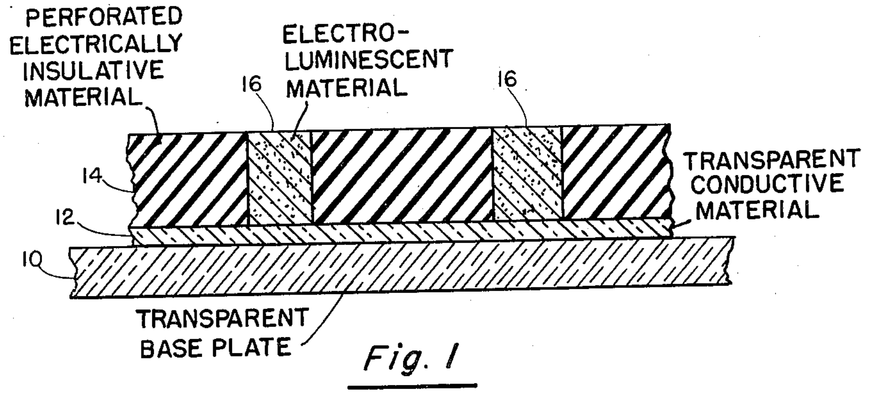
Figure 2:
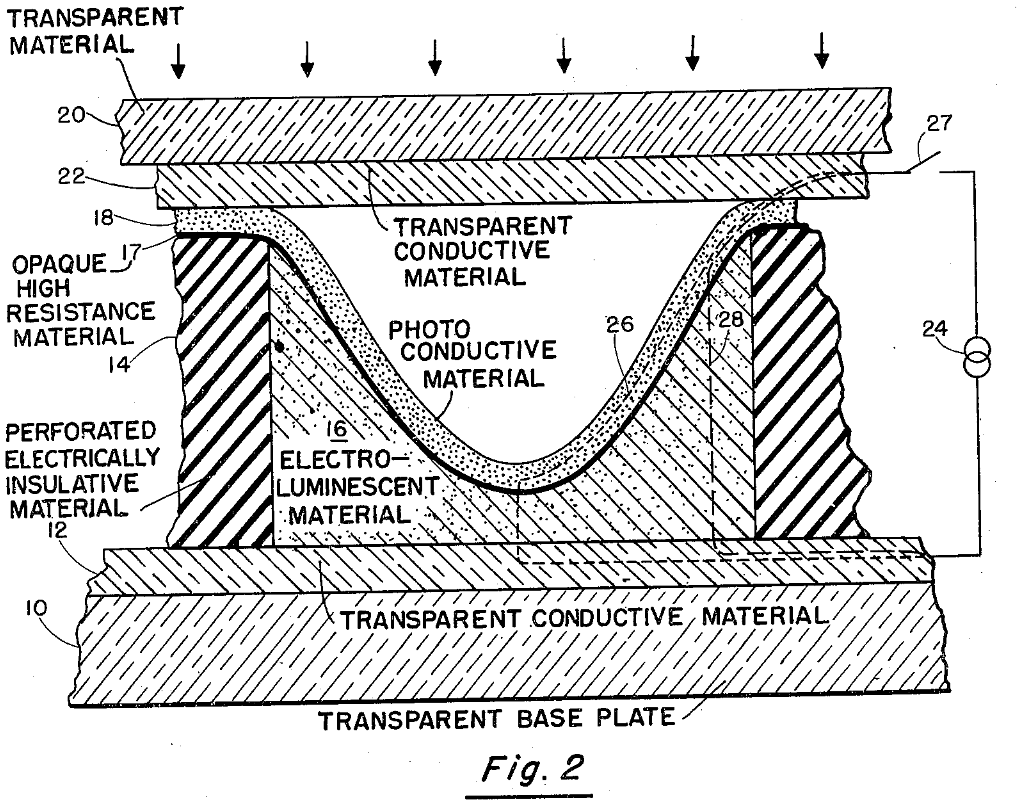

The attainment of these objects and others will be realized from the following specification, taken in conjunction with the drawings, in which, FIG. 1 shows a cross-sectional view of my invention during the manufacture thereof; and FIG. 2 shows an enlarged cross-sectional view of the finished assembly.

My invention contemplates the use of an electroluminescent cell that has a "dimpled" configuration. The resultant electrical paths provide a sufficiently high "dark" resistance, and a sufficiently low "light" resistance.

While my light amplifier is applicable to many forms of impinging radiation, in the interests of simplicity the following explanation will be presented in terms of visible or near visible incident radiation. In the presence of incoming radiation, a body will therefore be designated as "lighted," "illuminated," or "irradiated," while in the absence thereof it will be described as "dark" or "unirradiated."

My invention will be best understood by first referring to FIG. 1 which illustrates a stage in the process of construction. This shows a base plate 10 upon which has been deposited a coating 12 of conductive material, both of which are preferably transparent. Upon coating 12 is positioned a perforated, electrically insulative sheet 14, such as fotoform glass, or plastic screening. The perforations are then filled with a liquid mix 16 of electroluminescent material in a fluid binder. Mix 16 may readily be applied over a large area by spraying, flow-coating, or squeegeeing. In this way, a large number of cells are formed in a single operation.

As mix 16 hardens, it contracts, a contraction of 6 to 1 being readily achieved. As shown in FIG. 2, the contraction produces a "dimpled" or concave surface that is "continuous" with the unperforated upper surface of sheet 14. Thus, each cell comprises a plano-concave meniscus of electroluminescent material that is capable of glowing when a suitable electric field is impressed across it.

FIG. 2 shows an enlargement of the final structure of a single cell. The continuous surface comprising the upper unperforated surface of sheet 14 and the concave surface of electroluminescent material 16 is now covered with a film of photoconductive material 18. This film which may be sprayed, evaporated, or deposited by suitable chemical or mechanical processes is also concave, and arches downward. The periphery of the arch, however, is planar and forms a contact ring or area whose use will be hereinafter discussed. In any case, film 18 is easily applied to the entire mosaic of cells in a single operation.

Upon photoconductor 18 I place a sheet of material 20 that has on its lower surface a conductive coating 22. Coating 22 is planar, and contacts the previously described contact ring of photoconductor 18. Material 20 and coating 22 are transparent to the impinging radiation, and in the case of radiations generally called visible and near visible, material 20 may be glass while coating 22 may be a suitable form of tin oxide. A source of potential 24 is connected between coatings 12 and 22.

The operation of my invention is best seen from FIG. 2. In darkness, photoconductor 18 has a very high resistance. Current flow from source 24 through coating 22 at the contact ring and along the dotted path 26, meets the high resistance path of photoconductor 18—and the long path therethrough limits the field strength across the center of the cell to such a small value that the electroluminescent material does not glow. On the other hand, current flows along the shorter path through the edge portion of electroluminescent material 16, as shown by the dashed line 28, is limited since the thickness of the electroluminescent material at that point is so great that the field strength across each unit of thickness is too low to cause material 16 to glow. Thus, my inventive concept assures that the cell does not glow when unirradiated.

When radiation, approaching as shown by the arrows, traverses materials 20 and film 22, and illuminates photoconductor 18, the resistance thereof decreases. Current now flows through path 26, and the reduced resistance impresses a strong electric field across the thin central portion of electroluminescent material 16. It thereupon glows. This particular cell thus acts as a light amplifier for the incident radiation, and may be viewed through plate 10.

The specific cells of a mosaic upon which radiation impinges will glow in the above manner, but in adjacent cells which are not irradiated, the photoconductor still has a very high dark resistance that prevents the flow of current. Adjacent cells are therefore dark, unless the radiation falls directly upon them.

As hereinabove described, my light amplifier acts as a "storage" device; that is, momentary exposure to radiation produces a "permanent" picture for leisurely study. This results from "optical feedback," wherein light from the electroluminescent material irradiates the photoconductor, and maintains it in its low resistance state. The "permanent" picture can be erased by opening switch 27.

In those cases where the storage effect is not desired, it may be eliminated by a slight modification that prevents optical feedback. The modification consists of placing a thin layer 17 of opaque, high electrical resistance material, such as lamp black, between photoconductor 18 and electroluminescent material 16. Layer 17 prevents the light emitted by material 16 from striking photoconductor 18, which therefore returns to its high resistance state when the impinging radiation is removed. Layer 17 should have a high resistance so that the longitudinal path therethrough does not bypass the long path through photoconductor 18. However, the thinness of layer 17 does not interfere with the transverse passage of electricity therethrough, as the current follows dotted path 26.

Optical feedback may also be prevented by using a photoconductor 18 that is insensitive to the radiation emitted by electroluminescent material 16. Under these conditions the impinging radiations may be infrared or ultraviolet and the produced display would be in the visible spectrum which would not reduce the resistance of the photoconductor.

This latter arrangement has another advantage in that it prevents the spurious excitation known as "cross talk," wherein light from an excited cell tends to energize adjacent cells. Cross talk can also be prevented by making sheet 14 of an opaque material, whereby light from one cell cannot reach adjacent cells. My structure inherently minimizes cross talk, since the glowing central region of a cell is relatively distant from the photoconductors of adjacent cells.

Sheet 14 is conveniently made of fotoform glass, because of the ease with which it may be perforated. In addition, the form of this glass known as "fotoceram" is opaque and is therefore particularly well suited for structures wherein cross talk may be a problem.

While I have described a preferred embodiment of the invention, it will be understood that I wish to be limited not by the foregoing description, but solely by the claims granted to me.

What is claimed is:

1. In a light amplifier for producing visible light in response to impinging radiation, the combination comprising: a base plate having a contiguous electrically conductive coating on one surface thereof, said base plate and said coating being transparent to visible radiations; a sheet of perforated electrically insulative material positioned with its lower surface contiguous with said coating: an electroluminescent material, having a plano-concave meniscus configuration, positioned in said perforations, said concave portions being contiguous with the unperforated portion of the upper surface of said sheet, and said planar portion being in contact with said coating; a thin layer of opaque, high resistance material positioned contiguously with the upper unperforated surface of said sheet and said concave surface of said electroluminescent material; a film of photoconductive material positioned contiguously with said layer of opaque material, said photoconductor having the characteristic that its electrical resistance decreases when irradiated by said impinging radiation; a plate of backing material having a second contiguous coating of electrically conductive material on one surface thereof, said second coating touching the portions of said photoconductor that are on said unperforated portions of said upper surface of said sheet, and not touching said concave surface of said photoconductor, said backing material and said second coating being transparent to said impinging radiation; and a source of alternating potential connected between said electrically conductive coatings.

2. In a light amplifier for producing visible light in response to impinging radiation, the combination comprising: a base plate having a contiguous electrically conductive coating on one surface thereof, said base plate and said coating being transparent to visible radiations; a sheet of perforated electrically insulative material positioned with its lower surface contiguous with said coating; an electroluminescent material, having a plano-concave meniscus configuration, positioned in said perforations, said concave portions being contiguous with the unperforated portions of the upper surface of said sheet, and said planar portion being in contact with said coating; a film of photoconductive material positioned contiguously with the upper unperforated surface of said sheet and said concave surface of said electroluminescent material, said photoconductor having the characteristic that its electrical resistance decreases when irradiated by said impinging radiation; a plate of backing material having a second contiguous coating of electrically conductive material on one surface thereof, said second coating touching the portions of said photoconductor that are on said unperforated portions of said upper surface of said sheet, and not touching said concave surface of said photoconductor, said backing material and said second coating being transparent to said impinging radiation; a switch having one terminal connected to one of said coatings; a source of alternating potential; a connection between one terminal of said source and the other terminal of said switch; a connection between the other terminal of said source and said other coating.

3. The device of claim 2 wherein said perforated electrically insulative material is opaque to the radiations emitted by said electroluminescent material.

4. In a light amplifier for producing visible light in response to impinging radiation, the combination comprising: a base plate having a contiguous electrically conductive coating on one surface thereof, said base plate and said coating being transparent to visible radiations; a sheet of perforated electrically insulative material positioned with its lower surface contiguous with said coating; an electroluminescent material, having a plano-concave meniscus configuration; positioned in said perforations, said concave portions being contiguous with the unperforated portion of the upper surface of said sheet, and said planar portion being in contact with said coating; a film of photoconductive material positioned contiguously with the upper upperforated surface of said sheet and said concave surface of said electroluminescent material, said photoconductor having the characteristic that its electrical resistance decreases when irradiated by said impinging radiation but does not decrease when irradiated by the radiations emitted by said electroluminescent material; a plate of backing material having a contiguous second coating of electrically conductive material on one surface thereof, said second coating touching the portions of said photoconductor that are on said unperforated portions of said upper surface of said sheet, and not touching said concave surface of said photoconductor, said backing material and said second coating being transparent to said impinging radiation; and a source of alternating potential connected between said coatings.

5. In a light amplifier for producing visible light in response to impinging radiation, the combination comprising: a base plate having a contiguous electrically conductive coating on one surface thereof, said base plate and said coating being transparent to visible radiations; a sheet of perforated electrically insulative material positioned with its lower surface contiguous with said coating; an electroluminescent material, having a plano-concave meniscus configuration, positioned in said perforations, said concave portions being contiguous with the unperforated portion of the upper surface of said sheet, and said planar portion being in contact with said coating; a film of photoconductive material positioned contiguously with the upper unperforated surface of said sheet and said concave surface of said electroluminescent material, said photoconductor having the characteristic that its electrical resistance decreases when irradiated by said impinging radiation; means to prevent optical feedback between said electroluminescent material and said photoconductor; a plate of backing material having a contiguous second coating of electrically conductive material on one surface thereof, said second coating touching the portions of said photoconductor that are on said unperforated portions of said upper surface of said sheet, and not touching said concave surface of said photoconductor, said backing material and said second coating being transparent to said impinging radiation; and a source of potential connected between said coatings.

6. A light amplifier for producing visible light in response to impinging radiation, comprising in combination: an electrically conductive coating transparent to visible radiations; a sheet of perforated electrically insulative material positioned with its lower surface on said coating; a plano-concave meniscus configuration of electroluminescent material positioned in said perforations; a film of photoconductive material positioned contiguously with said concave surface of said electroluminescent material whereby said photoconductor has a contact ring, said photoconductor having the characteristic that its electrical resistance decreases when irradiated by a given radiation; means to prevent optical feedback between said electroluminescent material and said photoconductor; a second film of conductive material positioned to touch said contact ring of said photoconductor, said second coating being transparent to said impinging radiations; and means to apply a potential between said coatings.

7. A light amplifier for producing visible light in response to impinging radiation, comprising in combination: an electrically conductive coating transparent to visible radiations; a sheet of perforated electrically insulative material positioned with its lower surface on said coating; a plano-concave meniscus configuration of electroluminescent material positioned in said perforations; a film of photoconductive material positioned contiguously with said concave surface of said electroluminescent material whereby said photoconductor has a contact ring, said photoconductor having the characteristic that its electrical resistance decreases when irradiated by a given radiation; a second film of conductive material positioned to touch said contact ring of said photoconductor, said second coating being transparent to said impinging radiations;

and means, including a switch, to apply a potential between said coatings.

8. The combination comprising: an electrically conductive coating; an electroluminescent material having a plano-concave configuration, said planar portion contiguous with said coating; a thin layer of opaque material positioned contiguously with said concave portion; a film of photoconductive material positioned contiguously with said opaque material whereby a contact ring is formed; and planar film of electrically conductive material positioned to touch said contact ring whereby when said photoconductor is irradiated a potential applied between said coatings produces a strong electric field across the central portion of said electroluminescent material.

9. The combination comprising: an electrically conductive coating; an electroluminescent material having a plano-concave meniscus configuration, said planar portion contiguous with said coating; a film of photoconductive material positioned contiguously with said concave portion whereby a contact ring is formed; and means to apply a potential between said contact ring and said coating whereby when said photoconductor is irradiated a strong field is applied across the thinnest portion of said electroluminescent material.

10. The combination comprising: an electroluminescent material having a plano-arcuate configuration; a film of photoconductive material positioned contiguously with said curved surface of said electroluminescent material, whereby a contact area is formed; and means to apply a potential between said planar surface of said electroluminescent material and said contact area, whereby said arched surface of said photoconductor presents a high resistance when unirradiated but a low resistance when irradiated and thus, during irradiation, permits the application of a strong electric field across the thinnest portion of said electroluminescent material.

References Cited in the file of this patent

UNITED STATES PATENTS 2,897,399 Garwin et al. ------------ July 28, 1959